United States Patent
Liu et al.

(10) Patent No.: US 9,439,138 B2
(45) Date of Patent: Sep. 6, 2016

(54) METHODS AND APPARATUS FOR CELL SELECTION

(75) Inventors: Jinhua Liu, Beijing (CN); Xinyu Gu, Beijing (CN); Qingyu Miao, Beijing (CN); Stephen Grant, Pleasanton, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

(21) Appl. No.: 14/384,882

(22) PCT Filed: Mar. 14, 2012

(86) PCT No.: PCT/US2012/029030
§ 371 (c)(1),
(2), (4) Date: Sep. 12, 2014

(87) PCT Pub. No.: WO2013/137871
PCT Pub. Date: Sep. 19, 2013

(65) Prior Publication Data
US 2015/0023283 A1    Jan. 22, 2015

(51) Int. Cl.
*H04W 72/00* (2009.01)
*H04W 36/00* (2009.01)
*H04W 48/20* (2009.01)
(Continued)

(52) U.S. Cl.
CPC ............ *H04W 48/20* (2013.01); *H04W 36/08* (2013.01); *H04L 5/0035* (2013.01); *H04W 74/0833* (2013.01)

(58) Field of Classification Search
CPC ... H04W 48/20; H04W 72/00; H04W 36/08; H04W 24/02; H04W 74/0833; H04L 5/0094; H04L 5/0035; H04L 5/0048
USPC .......................................................... 370/329
See application file for complete search history.

(56) References Cited

U.S. PATENT DOCUMENTS

2010/0067470 A1* 3/2010 Damnjanovic ....... H04L 5/0053
370/329
2010/0291940 A1* 11/2010 Koo ...................... H04B 7/024
455/450

(Continued)

FOREIGN PATENT DOCUMENTS

EP            1641302 A1    3/2006
WO      2008/051466 A2    5/2008
(Continued)

OTHER PUBLICATIONS

European Search Report for Application No. PCT/US2012/029030, mailed May 11, 2015, 4 pages.

(Continued)

*Primary Examiner* — Curtis A Alia
*Assistant Examiner* — Vanneilian Lalchinthang
(74) *Attorney, Agent, or Firm* — Nicholson De Vos Webster & Elliott LLP

(57) ABSTRACT

The present disclosure relates to a cell selection scheme. In one embodiment, there provides a method for performing a cell selection for a UE at a primary serving cell of the UE in a CoMP cluster including the primary serving cell and one or more candidate cells, the method comprising the steps of: receiving PRACH measurements for the UE from the candidate cells; and selecting from the candidate cells one or more cells for the UE as its secondary serving cells based on the received PRACH measurements.

25 Claims, 7 Drawing Sheets

CONVENTIONAL SYSTEM

DOMINANT OTHER-CELL INTERFERENCE

CoMP SYSTEM

(51) Int. Cl.
*H04W 36/08* (2009.01)
*H04L 5/00* (2006.01)
*H04W 74/08* (2009.01)

(56) References Cited

U.S. PATENT DOCUMENTS

| | | | | |
|---|---|---|---|---|
| 2011/0080879 | A1* | 4/2011 | Grant | 370/329 |
| 2012/0002643 | A1* | 1/2012 | Chung | H04J 11/0093 370/331 |
| 2012/0057535 | A1* | 3/2012 | Zhang | H04W 72/0426 370/329 |
| 2013/0028180 | A1* | 1/2013 | Gao | H04W 74/004 370/328 |
| 2013/0286928 | A1* | 10/2013 | Xu et al. | 370/315 |

FOREIGN PATENT DOCUMENTS

| | | |
|---|---|---|
| WO | 2008/133471 A1 | 11/2008 |
| WO | 2011/109544 A1 | 9/2011 |
| WO | 2012/006122 A1 | 1/2012 |

OTHER PUBLICATIONS

Notification of Transmittal of the International Search Report and the Written Opinion of the International Searching Authority, or the Declaration for corresponding application PCT/US2012/029030, mailed Jun. 15, 2012, 9 pages.

Notification of Transmittal of International Preliminary Report on Patentability for corresponding application PCT/US2012/029030, mailed Jan. 17, 2014, 10 pages.

"3rd Generation Partnership Project; Technical Specification Group Radio Access Network; Physical layer procedures (FDD) (Release 10)", 3GPP TS 25.214 V10.6.0 (Mar. 2012), 100 pages.

* cited by examiner

METHODS AND APPARATUS FOR CELL SELECTION

CROSS-REFERENCE TO RELATED APPLICATIONS

This application is a National stage of International Application No. PCT/US2012/029030, filed Mar. 14, 2012, which is hereby incorporated by reference.

TECHNICAL FIELD

The disclosure relates to cell selection, and more particularly, to methods and apparatus for performing cell selection in a CoMP communication system.

BACKGROUND

Unless otherwise indicated herein, the approaches described in this section are not prior art to the claims in this application and are not admitted to be prior art by inclusion in this section.

Coordinated Multi-Point (CoMP) solution is currently being considered for UpLink (UL) of both HSPA and LTE systems. The main idea of UL CoMP is to pool several sector antennas between and/or within base station sites and process the received multi-antenna signals in a centrally located processing unit. Signals that were previously treated as inter-cell interference are now treated as desired signals. Using a number of antennas, the detection of the multiple user signals can be done either in a linear fashion, e.g., minimum-mean-squared-error (MMSE) equalization approaches, or in a non-linear fashion, e.g., successive interference cancellation (SIC) or maximum likelihood (ML) type approaches. Reconfiguring a traditional cellular system in this way offers the potential to increase both cell-edge bit rates and system capacity.

FIG. 1 illustrates an example of uplink CoMP. On the left of FIG. 1, a conventional system is shown consisting of 2 cells with one active UE in each. The UEs are shown located near the cell edges such that each one creates dominant inter-cell interference in the respective non-serving cells. For example, in cell-1, UE 1 is detected in the presence of inter-cell interference from UE 2. The detection utilizes only the two antennas available at the base station in cell-1. In contrast, in the CoMP system as shown on the right of FIG. 1, the signals from geographically separated antenna sites are transported to a common location for processing within the CoMP cluster. In effect, this creates a 4-antenna base station. UE 1 and UE 2 are then treated as desired signals and detected using a suitable multi-user detection (MUD) approach, either linear or non-linear. Due to the increased number of antennas and MUD, significantly improved performance may be expected. The largest improvement occurs when the signals from UE 1 and UE 2 are received at both sites with approximately equal strength. This occurs most probably for UEs located at the edges of the cells defined in the conventional system. This is why CoMP is viewed primarily as a technique to boost cell-edge throughput.

FIG. 2 illustrates an example CoMP cluster layout highlighting 2 CoMP clusters. Each CoMP cluster is formed from 6 cells (sectors) of a conventional hexagonal layout. At each 3-sector base station site, the arrows indicate sector antennas and the direction in which the antenna main lobes "point." Note that each sector antenna consists of two physical antennas; hence a total of 12 antennas from two different sites are associated with each CoMP cluster.

The sector antennas associated with each CoMP cluster are connected to the Node B via fiber optic cable, or other transport technologies like micro wave, etc. This can be achieved using a Main-Remote type architecture. Using this kind of architecture, each sector antenna is first connected to a remote radio unit (RRU) which implements RF functionality followed by analog to digital conversion. 6 such RRUs (with two physical antennas each) are then connected to one main unit (MU) which implements all of the standard Node B functionality. The fiber optic cables connecting the RRUs to an MU carry I-Q samples for processing at baseband. In this way, the Node B can jointly process I-Q samples from up to 12 antennas associated with each CoMP cluster.

Hereunder, in the present disclosure, the term "sector" and the term "cell" might be used synonymously herein unless being explicitly indicated.

The UE access procedure for WCDMA is described in 3GPP TS 25.214. The procedures of DCH in Cell_FACH and EUL in Cell_FACH procedure are illustrated in FIG. 3 and FIG. 4 respectively. $T_{p-p}$ is time duration between the start of the first and the start of the next PRACH preamble if the first PRACH preamble is not acknowledged by demodulating the information over AICH. $T_{p-m}$ is the time duration between the start of the acknowledged PRACH preamble and the start of the DPCCH preamble. The PRACH preamble ramping procedures in these two cases are similar. In case of the random access procedure for radio link establishment, the coming data includes that for the RRC signaling. In case of the random access procedure for a UE in Cell_FACH, the coming data is usually the traffic data.

When a UE in Cell_FACH has uplink data to transmit, the UE should initiate the random access procedure and start the data transmission after the PRACH preamble is acknowledged by the network. The access delay can be estimated by $x*T_{p-p}+T_{p-m}$, where x is the number of PRACH preamble transmissions that the UE has performed until the UE successfully accesses the network. The primary serving cell knows that there will be a data transmission when it detects a preamble sent by this UE and decides to admit the UE. The primary serving cell has a time of at least $T_{p-m}$ to prepare the hardware to receive the data from the UE. $T_{p-m}$ can be at least 2 ms. In practice, there can also be several DPCCH preamble slots before the uplink data transmission takes place, which means the primary serving cell has even more than 2 ms for the hardware preparation to receive the uplink data from this UE.

Hereinafter, the primary serving cell for a UE refers to the cell to which the PRACH preamble selected by the UE during the random access procedure belongs.

It is well-known that UL CoMP has very good gain for short data transmissions compared to non-CoMP in a WCDMA system where soft and softer handover is supported in uplink. This is because the non-CoMP system, which relies on softer handover, may not have enough time to select, configure and activate non-serving cells into the active set for achieving gains for the short data burst transmission (for instance in Cell_FACH) or the signaling transmission procedure for initial radio link establishment. In contrast, in the CoMP system the links to several CoMP cells are available on a faster basis, which means they can be added based on relatively quick uplink measurements (path searcher updates) rather than active set updates. It is further valuable to achieve the CoMP gain for a UE during radio link establishment (RACH procedure) and short data transmission. To achieve the gain in such scenarios, it is required to determine the CoMP cells as quick as possible with a certain acceptable complexity.

The measurement report from UE is usually utilized to determine the secondary CoMP cells. Since such measurement reports are only available after the radio link setup and of low transmitting frequency, it is difficult to achieve the CoMP gain for the signaling and data transmission during radio link establishment stage and the short data transmission.

SUMMARY

According to the present disclosure, a scheme of cell selection is proposed to achieve fast CoMP cell selection so that the CoMP gain can be achieved even for short data transmission or the signaling transmission during the radio link establishment.

In a first aspect of the present disclosure, there is provided a method for performing a cell selection for a UE at a primary serving cell of the UE in a CoMP cluster including the primary serving cell and one or more candidate cells, the method comprising the steps of: receiving PRACH measurements for the UE from the candidate cells; and selecting from the candidate cells one or more cells for the UE as its secondary serving cells based on the received PRACH measurements.

Alternatively, the PRACH measurements are strengths of a PRACH preamble signal from the UE, the strengths being obtained by the candidate cells.

In one example, the PRACH measurements are based on all PRACH preambles belonging to all cells in the CoMP cluster.

In another example, the method further comprises the steps of: detecting a PRACH preamble signal of the UE to obtain PRACH information of the UE; and transmitting the PRACH information to the candidate cells for obtaining the PRACH measurements.

Alternatively, the PRACH information comprises at least one of the UE's scrambling code, PRACH preamble sequence, PRACH timing, and direction of angle (DoA).

Furthermore, each of the PRACH measurements is based on the PRACH information and a PRACH preamble signal, which is previously received by the corresponding candidate cell from the UE.

Furthermore, the method further comprises a step of: instructing each of the candidate cells to perform path searching for the UE based on the PRACH information.

Alternatively, the path searching is performed on antennas at each of the candidate cells to obtain path strengths as the PRACH measurements.

Alternatively, the candidate cells are neighbor cells to the primary serving cell within the CoMP cluster.

Alternatively, the candidate cells are all the cells in the CoMP cluster other than the primary serving cell.

In still another example, the method further comprises: after receiving the PRACH measurements for the UE from the candidate cells, terminating the cell selection when all of the received PRACH measurements are lower than a first threshold.

In yet another example, the method further comprises: before receiving the PRACH measurements for the UE from the candidate cells, obtaining the primary serving cell's PRACH measurement for the UE and comparing the obtained PRACH measurement with a second threshold.

Alternatively, the method further comprises comprising terminating the cell selection when the primary serving cell's PRACH measurement for the UE is higher than the second threshold.

In a second aspect of the present disclosure, there is provided a computer-readable storage medium having computer-readable instructions to facilitate cell selection in a CoMP cluster that are executable by a computing device to carry out the method as proposed in the first aspect.

In a third aspect of the present disclosure, there is provided an apparatus for performing a cell selection for a UE at a primary serving cell of the UE in a CoMP cluster including the primary serving cell and one or more candidate cells, the apparatus serving the primary serving cell and including: a receiving unit configured to receive PRACH measurements for the UE from the candidate cells; and a selecting unit configured to select from the candidate cells one or more cells for the UE as its secondary serving cells based on the received PRACH measurements.

In a fourth embodiment of the present disclosure, there is provided an apparatus for use in a cell selection for a UE at a primary serving cell of the UE in a CoMP cluster including the primary serving cell and one or more candidate cells, the apparatus serving one of the candidate cells and including: a PRACH measurement obtaining unit configured to obtain a PRACH measurement for the UE; a transmitting unit configured to transmit the PRACH measurement to the primary serving cell for use in the cell selection.

Alternatively, the PRACH measurement obtaining unit is configured to obtain the PRACH measurement based on all PRACH preambles belonging to all cells in the CoMP cluster.

As an example, the apparatus further comprises: a receiving unit configured to receive a PRACH preamble signal from the UE and to receive PRACH information of the UE from the primary serving cell.

Alternatively, the PRACH information comprises at least one of the UE's scrambling code, PRACH preamble sequence, PRACH timing, and direction of angle (DoA).

Alternatively, the PRACH measurement obtaining unit is configured to obtain the PRACH measurement based on the PRACH information and the PRACH preamble signal.

Furthermore, the apparatus further comprises: a path searching unit configured to perform path searching on an antenna of the one of the candidate cells, which is served by the apparatus, based on the PRACH information to obtain a path strength as the PRACH measurement.

The embodiments of the present disclosure at least lead to the following benefits and advantages:

Enhancement of efficiency in determining the secondary serving cells in CoMP;

Reduction of complexity in determining the secondary serving cells in CoMP;

Achieving CoMP gain for

UEs at Cell_FACH;

The signaling during radio link establishment;

Short data transmission.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

Figure 1:
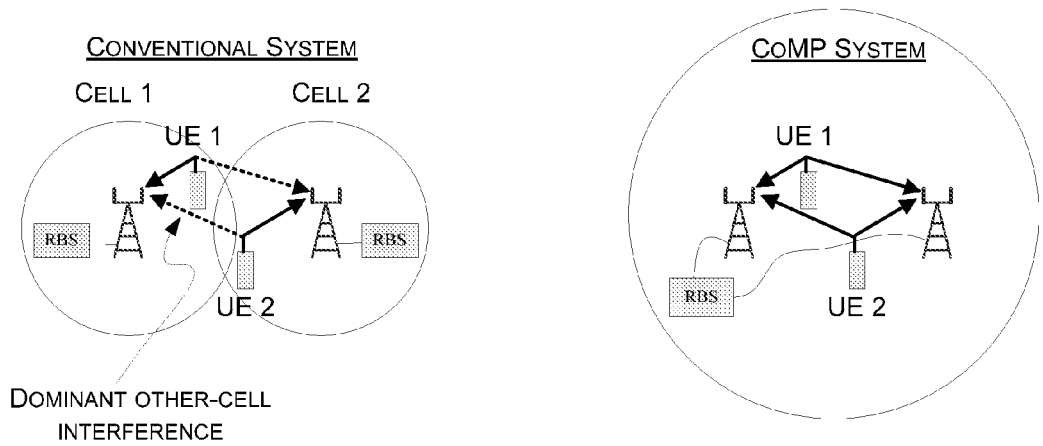
FIG. 1 illustrates a conventional system and a CoMP system.
Figure 2:
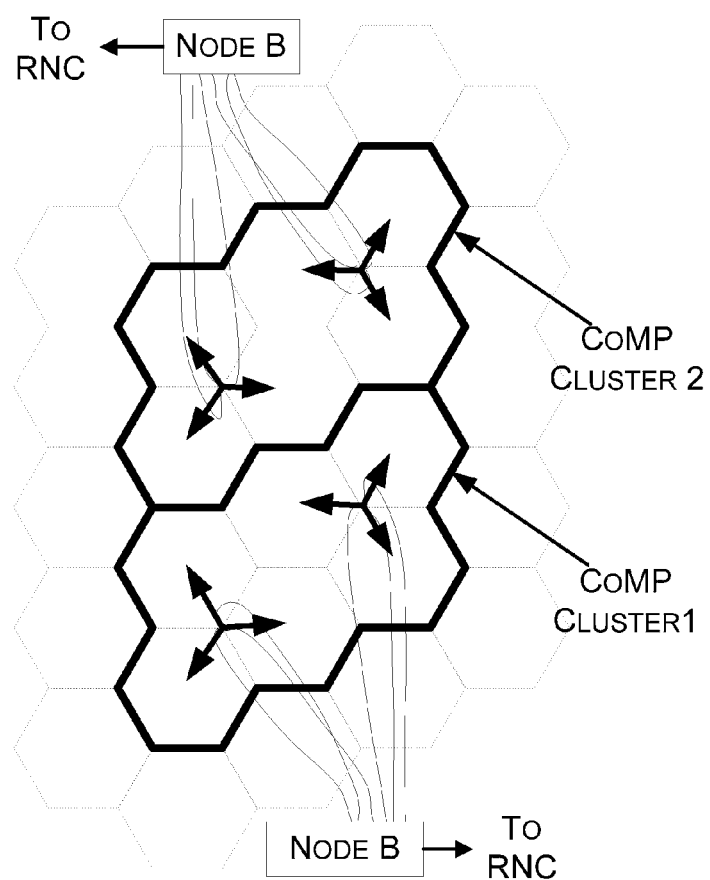
FIG. 2 illustrates an example CoMP layout.
Figure 3:
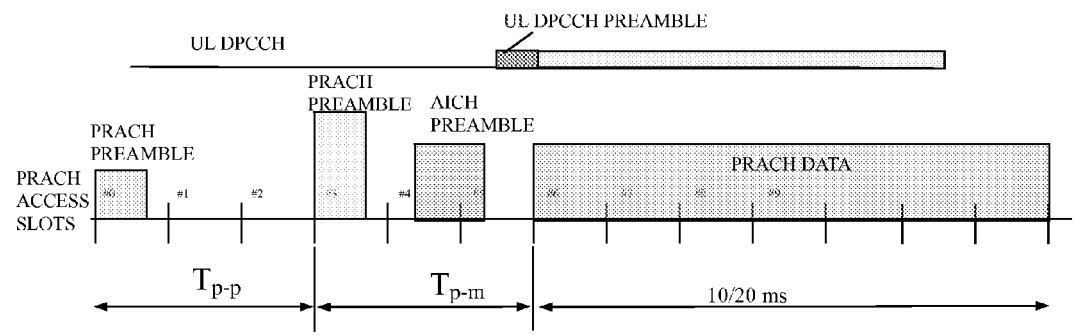
FIG. 3 illustrates a procedure of Cell_FACH in Release 99.
Figure 4:
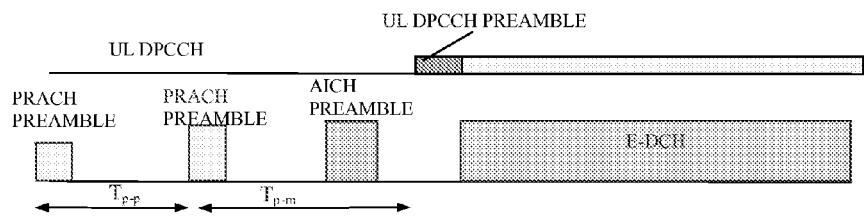
FIG. 4 illustrates a procedure of Enhanced Uplink in Cell_FACH.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

The CoMP cell selection can either mean to select the CoMP cells or the best receiver antennas within the CoMP cluster. The only difference between the two methods is that for the former all the receiver antennas belonging to the selected CoMP cell while for the later only the selected antennas are included in the joint processing. Which method is to be used should be predefined/configurable in an implementation.

Furthermore, although the present disclosure is exemplified in the context of uplink CoMP, the disclosed embodiments can also be applied to select the CoMP cells for downlink CoMP transmissions especially during the session setup or short data transmissions for UEs in Cell_FACH over HSDPA.

The present disclosure is exemplified in the context of WCDMA-HSPA system where the CoMP transmission is applied, while the similar principles and algorithms can be simply extended to other wireless communication systems, such as TD-SCDMA, CDMA2000, LTE systems, etc.

Figure 5:
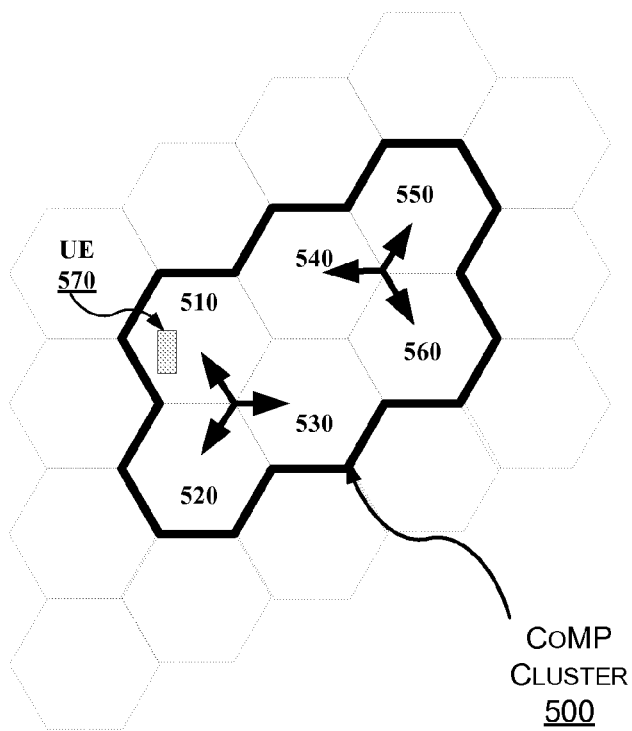
FIG. 5 illustrates a CoMP scenario where the present application may be applied.

FIG. 5 illustrates an example CoMP cluster 500 where the present application may be applied. As shown in FIG. 5, the CoMP cluster 500 is formed from 6 cells of a conventional hexagonal layout, denoted as cells 510-560. There is a UE 570 located in cell 510, thus cell 510 may be referred to as the primary serving cell for the UE 570, and one or more of the remaining cells may be considered as candidate cells for CoMP processing of the UE 570.

Figure 6:
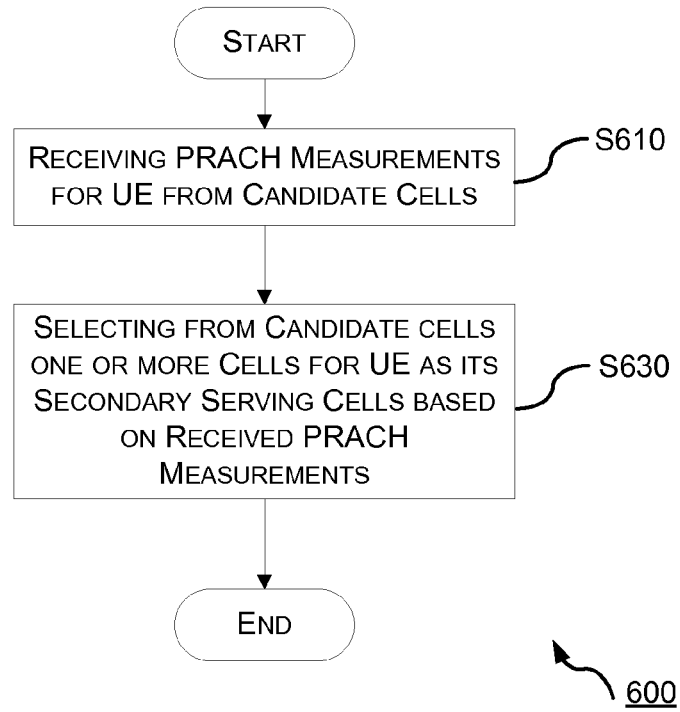
FIG. 6 illustrates a flowchart of a method for performing a cell selection according to a first embodiment of the present application.

FIG. 6 shows a flowchart of a method 600 for performing a cell selection for a UE at a primary serving cell of the UE in a CoMP cluster including the primary serving cell and one or more candidate cells according to a first embodiment of the present application. As shown in FIG. 6, the primary serving cell may receive PRACH measurements for the UE from the candidate cells in step S610. Then, the primary serving cell may select from the candidate cells one or more cells for the UE as its secondary serving cells based on the received PRACH measurements in step S630. As mentioned above, the selection of secondary serving cell here can either mean to select a cell or to select antennas in a cell.

As an example, the method 600 may be particularly applied in the scenario as illustrated in FIG. 5 as follows. Specifically, cell 510 may receive PRACH measurements for the UE 570 from one or more of cells 520-560 being the candidate cells. Then, cell 510 may select from the candidate cells one or more cells for the UE 570 as its secondary serving cells based on the received PRACH measurements. It should be appreciated that the method 600 may be also applied to various CoMP scenarios other than that illustrated in FIG. 5.

By way of a non-limiting example, the PRACH measurements may be strengths of a PRACH preamble signal from the UE. In this case, for example, the cells having highest strengths among the candidate cells may be selected as the secondary serving cells. Moreover, the strengths of the PRACH preamble signal may be obtained by the candidate cells.

As an example, the PRACH measurements may be based on all PRACH preambles belonging to all cells in the CoMP cluster 500. This is a straight forward method for the cell selection and may be referred to as "full search" method here. Specifically, each cell within the CoMP cluster 500 may monitor all the PRACH preambles belonging to all cells (i.e. cells 510-560 in this embodiment) within the CoMP cluster 500 and report the measurement results to cell 510. Then, cell 510 may determine the secondary serving cells according to the results of measurement accordingly before the data transmission start.

Conceptually, this may be obtained by a method to extend the functionality of the searcher to search over all antennas in a CoMP cell. Rather searching only over the antennas contained within the active set as normal, the search here may be performed over a larger number of antennas. With this approach, the antenna selection is implicitly performed using received signal strength as a basis since the searcher bases its decisions on the power delay profile measured for each UE. Once the channel taps are identified on all antennas, they may be sorted, and fingers are placed on the antennas with the largest channel taps. In this way the Rake/G-Rake+ receiver may automatically span the antennas with the largest signal strength.

This method may result in that each CoMP cell have to monitor N*16 (N is the number of cells in the CoMP cluster with different cell IDs, referred as the CoMP cluster size, and N is 6 in this embodiment) PRACH preambles. However, this method can beneficially determine the secondary serving cells/best antennas correctly with the shortest delay.

Figure 7:
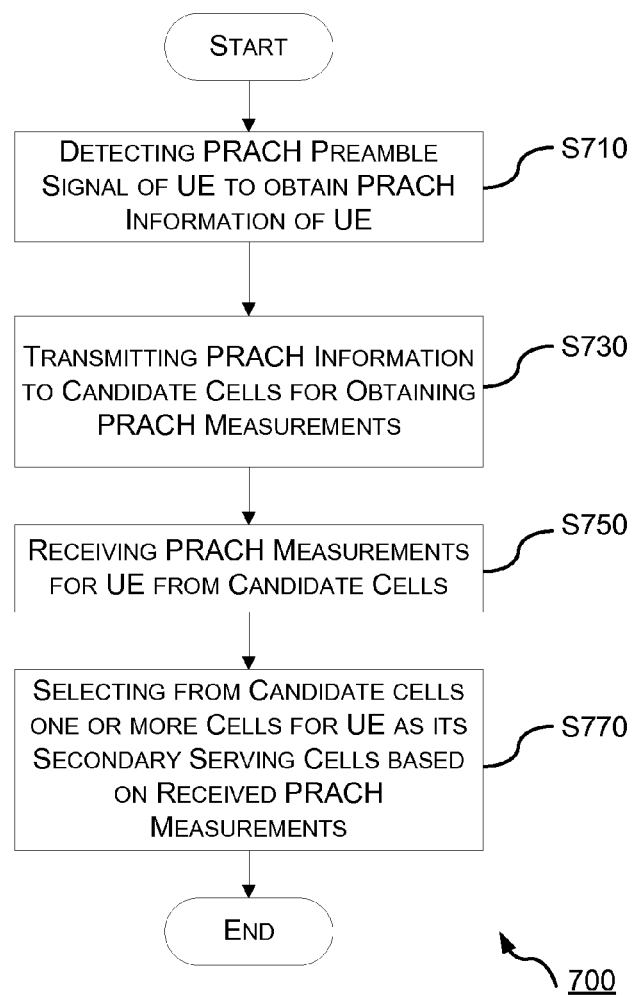
FIG. 7 illustrates a flowchart of a method for performing a cell selection according to a second embodiment of the present application.

FIG. 7 shows a flowchart of a method 700 for performing a cell selection for a UE at a primary serving cell of the UE in a CoMP cluster including the primary serving cell and one or more candidate cells according to a second embodiment of the present application. For the sake of simplicity, the method 700 as illustrated in FIG. 7 is also depicted in combination with FIG. 5 hereinafter. That is, the method 700 may perform the cell selection for the UE 570 at cell 510 in the CoMP cluster 500. Of course, it should be appreciated that such a method can be also applied to various CoMP scenarios other than that illustrated in FIG. 5.

In step S710, cell 510 detects a PRACH preamble signal of the UE 570 to obtain PRACH information of the UE 570. By way of a non-limiting example, the PRACH information here may include at least one of the UE's scrambling code, PRACH preamble sequence, PRACH timing, and direction of angle (DoA). That is, the PRACH information may include but not limited to any one of these parameters, or any combinations of these parameters, For example, the PRACH information may be scrambling code, or PRACH preamble sequence, or scrambling code and DoA, or scrambling code and other parameters not listed herein.

In Step 730, cell 510 transmits the PRACH information to the candidate cells for obtaining the PRACH measurements.

By way of a non-limiting example, after receiving the PPACH information from cell 510, each candidate cell performs respective PRACH measurement based on the PRACH information and the PRACH preamble signal. The PRACH preamble signal from the UE may be previously received and buffered by each candidate cell.

In practice, each cell in the CoMP cluster only searches the PRACH preambles belonging to this cluster and buffers the received signal for later PRACH preamble measurement. After receiving the PRACH information from the primary serving cell, each candidate cell may measure a strength of the PRACH preamble signal based on the buffered signal and the received PRACH information. In this manner, the use of the PRACH information from the primary serving cell may reduce the computation complexity and the hardware cost since each candidate cell only has to measure the PRACH preamble indicated by the primary serving cell (other than all PRACH preambles belonging to all cells in the CoMP cluster as noted above).

As a non-limiting example, after receiving the PRACH information from the primary serving cell, a candidate cell may determine whether to measure the PRACH indicated by the primary serving cell based on its computation load and the hardware utilization. For instance, if the computation load is higher than a certain level and/or the hardware utilization of the candidate cell exceeds another certain level, the candidate cell can reject measuring the PRACH requested by the primary serving cell due to the high computation or hardware utilization load and report the rejection and or the cause to the primary serving cell.

There are different methods to measure the strength of the PRACH preamble signal in the candidate cells. As a non-limiting example, each candidate cell may measure the PRACH strength based on the correlation between the PRACH preamble sequence and the received signal (i.e. a PRACH preamble signal). Cells with high enough PRACH preamble signal strengths can be regarded to have a good uplink radio quality and may serve as secondary serving cells.

Moreover, the method 700 may further comprise steps S750 and S770, which are similar to Steps 610 and 630, respectively. Specifically, the primary serving cell may receive PRACH measurements for the UE from the candidate cells in step S750, and the primary serving cell may select one or more candidate cells for the UE as its secondary serving cells based on the received PRACH measurements in step S770. For example, the primary serving cell may select a cell having a highest PRACH preamble signal strength among the candidate cells as one of its secondary serving cells.

Figure 8:
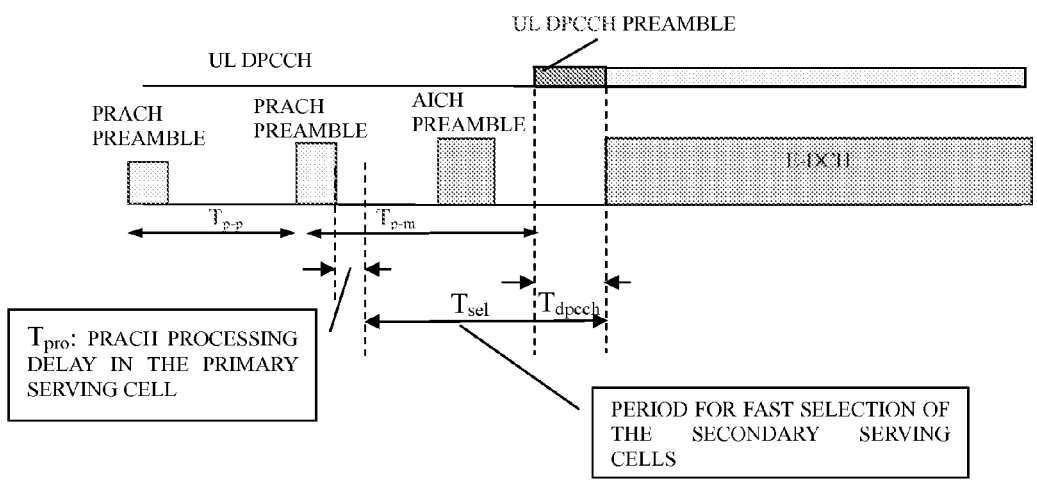
FIG. 8 illustrates a timing diagram of fast CoMP cell selection in case of EUL in Cell_FACH.

FIG. 8 shows a timing diagram of fast CoMP cell selection in case of EUL in Cell_FACH.

As shown in FIG. 8, the primary serving cell needs a time period of $T_{pro}$ to detect the PRACH preamble signal. Once a PRACH preamble signal is detected, the primary serving cell sends the PRACH information (including at least one of PRACH preamble sequence, the PRACH preamble signal strength, the arrival time of the PRACH in the primary serving cell, etc) to the candidate cells and the candidate cells starts to measure the PRACH preamble signal indicated by the primary serving cell and report PRACH measurements to the primary serving cell. Then, the primary serving cell selects and activates the secondary serving cells based on the measurements from the candidate cells. It is better to activate the secondary serving cells before the DPCCH preamble starts, while it is also acceptable to activate the secondary serving cells during the transmission of UL DPCCH preamble.

With such a method according to the second embodiment of the present application, only the selected candidate cells (rather than all the other cells in the CoMP cluster) should detect the PRACH preamble indicated by the primary serving cells (rather than all the PRACH preambles belonging to all cells in the CoMP cluster).

Figure 9:
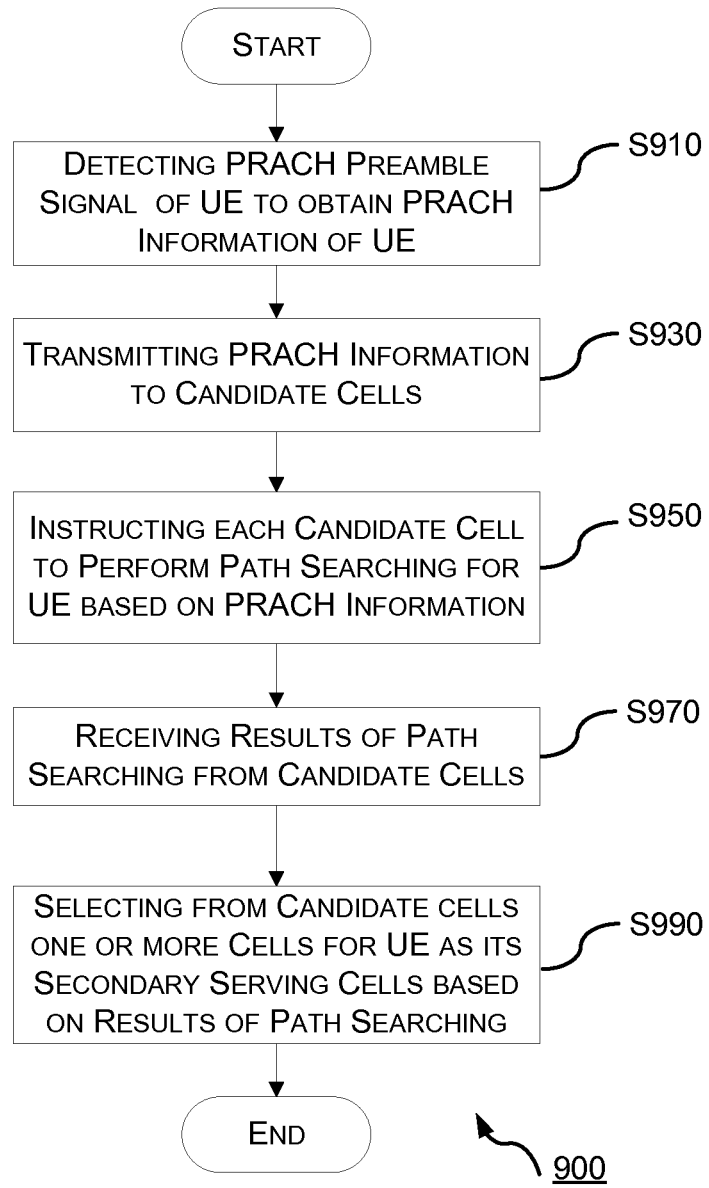
FIG. 9 illustrates a flowchart of a method for performing a cell selection according to a third embodiment of the present application.

FIG. 9 shows a flowchart of a method 900 for performing a cell selection according to a third embodiment of the present application. For the sake of simplicity, the method 900 as illustrated in FIG. 9 is also depicted in combination with FIG. 5 hereinafter. That is, the method 900 performs the cell selection for the UE 570 at cell 510 in the CoMP cluster 500. Of course, it should be appreciated that such a method may be also applied to various CoMP scenarios other than that illustrated in FIG. 5.

In step S910, cell 510 detects a PRACH preamble signal of the UE 570 to obtain PRACH information of the UE 570. In this case, the primary serving cell knows there is an incoming data transmission from the UE 570.

By way of a non-limiting example, the PRACH information here may include at least one of the UE's scrambling code, PRACH preamble sequence, PRACH timing, and direction of angle (DoA), or any combinations thereof.

In Step 930, cell 510 transmits the PRACH information to the candidate cells for obtaining the PRACH measurements. In this manner, the primary serving cell may share the PRACH information of the UE with all the candidate cells in the CoMP cluster.

In Step 950, cell 510 instructs each of the candidate cells to perform path searching for the UE based on the PRACH information.

As an example, the PRACH preamble signal strength based on the detected path of the PRACH (referred to as the path strength) may be measured by path searching. For example, a cell with a stronger main path may be regarded to have a better quality and my serve as a secondary serving cell.

In this case, the PRACH measurements may be results of the path searching, i.e. path strengths.

As another example, the path searching may be performed on antennas at each of the candidate cells based on the PRACH information so as to obtain path strengths as the corresponding PRACH measurements.

Specifically, the primary serving cell may trigger an extending path searching action only for the upcoming data transmission. That is, the primary serving cell may extend the path searching among all the antennas in the CoMP cluster so that all the antennas are involved in the detecting of the DPCCH (or DPCCH preamble) of the UE.

With the extended path searching, the antenna selection is implicitly performed using received signal strength as a basis since the searcher bases its decisions on the power delay profile measured for each user. Once the channel taps are identified on all antennas, they are sorted, and fingers are placed on the antennas with the largest channel taps. In this way the Rake/G-Rake+ receiver automatically spans the antennas with the largest signal strength.

Furthermore, the method 900 may further comprise steps S970 and S990, which are similar to Steps 610 and 630, respectively. Specifically, the primary serving cell receives PRACH measurements for the UE (which may be the results of the path searching in this embodiment) from the candidate cells in step S970, and the primary serving cell may select from the candidate cells one or more cells for the UE as its secondary serving cells based on the received PRACH measurements in step S990.

By way of a non-limiting example, the PRACH measurements may be results of the path searching, i.e. path strengths measured by the candidate cells. In this case, for example, a cell (a cell that has an antenna) having a highest path strength among the candidate cells may be selected as one of the secondary serving cells.

With the method according to the third embodiment of the present application, the path searching here may be applied to the data transmission of a certain UE. A candidate cell only needs to measure the received power strength of the UE or the strength of one or more of physical channels of the UE according to the received information (e.g., scrambling codes) from the primary serving cell of the UE. Due to the needed information is already informed by the primary serving cell, there is no need to buffer the received signal to measure the said signal strength for the selection/changing of the secondary serving cells. Further according to this embodiment, the primary serving cell should inform the candidate cells when a UE's scrambling code is reconfigured due to, for instance, the serving cell change or radio link reestablishment.

As a non-limiting example according to one of the first, second and third embodiments of the present disclosure, after receiving the PRACH measurements for the UE from the candidate cells, the primary serving cell may compare the PRACH measurements from the candidate cells with a first threshold and terminates the cell selection if all of the received PRACH measurements are lower than the first threshold. Otherwise, the primary serving cell may send the PRACH information to the candidate cells in the CoMP cluster. Further, if the primary serving cell can detect the DoA of the UE, according to which the primary serving cell knows the possible candidate cells, the primary serving cell can only inform the candidate cells who might detect the UE's signal.

As a non-limiting example according to one of the first, second and third embodiments of the present disclosure, before receiving the PRACH measurements for the UE from the candidate cells, the primary serving cell may obtain the primary serving cell's PRACH measurement for the UE and then compare the obtained PRACH measurement with a second threshold. If the primary serving cell's PRACH measurement for the UE is higher than the second threshold, the primary serving cell may terminate the cell selection. That is, the primary serving cell does not select any candidate cell because the UE is probably located in the center of the primary serving cell and the user experience can be guaranteed due to good uplink quality. Otherwise, it may proceed with steps as shown in either of FIGS. 6, 7 and 9.

By way of a non-limiting example according to the above embodiments of the present disclosure, the candidate cells may be either neighbor cells to the primary serving cells within the same CoMP cluster (such as one or more of cells 520-540), or all the cells in the same CoMP cluster other than the primary serving cell (such as cells 520-560 as shown in FIG. 5).

Figure 10:
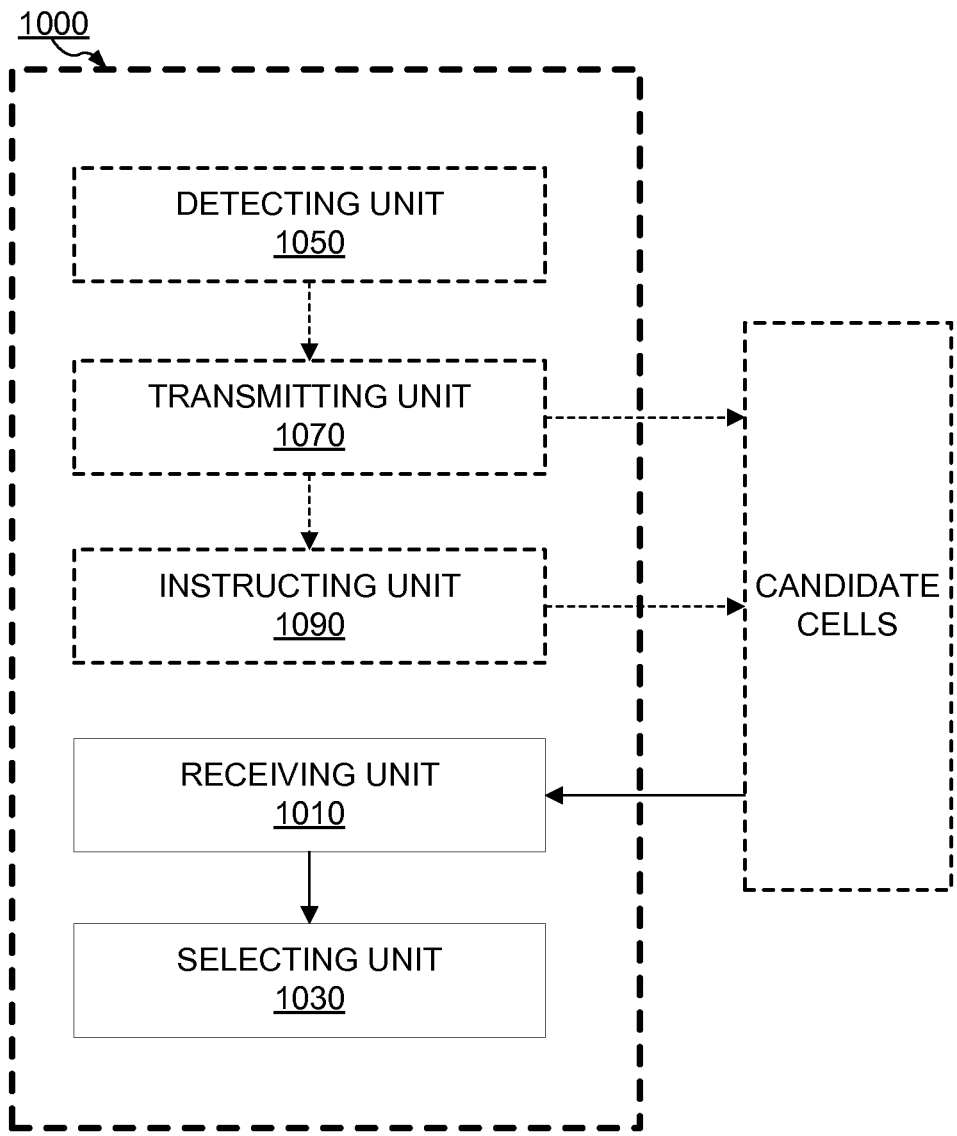
FIG. 10 is a block diagram illustrating an apparatus for performing a cell selection according to a fourth embodiment of the present application.

FIG. 10 is a block diagram illustrating an apparatus 1000 for performing a cell selection for a UE at a primary serving cell of the UE in a CoMP cluster according to a fourth embodiment of the present application. The CoMP cluster includes the primary serving cell and one or more candidate cells. The apparatus 1000 serves the primary serving cell. An example of the apparatus 1000 may be a base station.

As shown in FIG. 10, the apparatus 1000 according to the fourth embodiment of the present invention may include a receiving unit 1010, a selecting unit 1030, a detecting unit 1050, a transmitting unit 1070 and an instructing unit 1090. The detecting unit 1050, the transmitting unit 1070, and the instructing unit 1090 may be optional and denoted in dotted lines as shown in FIG. 10.

The receiving unit 1010 may be configured to receive PRACH measurements for the UE from the candidate cells. The selecting unit 1030 may be configured to select from one or more candidate cells for the UE as its secondary serving cells based on the received PRACH measurements.

By way of a non-limiting example, the PRACH measurements may be PRACH strengths of a PRACH preamble signal from the UE, the PRACH strengths being obtained by the candidate cells.

By way of a non-limiting example, the PRACH measurements may be based on all PRACH preambles belonging to all cells in the CoMP cluster.

By way of a non-limiting example, the candidate cells may be either neighbor cells to the primary serving cell within the CoMP cluster, or all the cells in the CoMP cluster other than the primary serving cell.

The detecting unit 1050 may be configured to detect a PRACH preamble signal of the UE to obtain PRACH information of the UE. The transmitting unit 1070 may be configured to transmit the PRACH information to the candidate cells for obtaining the PRACH measurements.

By way of a non-limiting example, wherein the PRACH information may comprise at least one of the UE's scrambling code, PRACH preamble sequence, PRACH timing, and direction of angle (DoA), or any combinations thereof.

By way of a non-limiting example, each of the PRACH measurements may be based on the PRACH information and a PRACH preamble signal, which is previously received by the corresponding candidate cell from the UE.

The instructing unit 1090 may be configured to instruct each of the candidate cells to perform path searching for the UE based on the PRACH information.

By way of a non-limiting example, the path searching may be performed on antennas at each of the candidate cells to obtain path strengths as the PRACH measurements.

Figure 11:
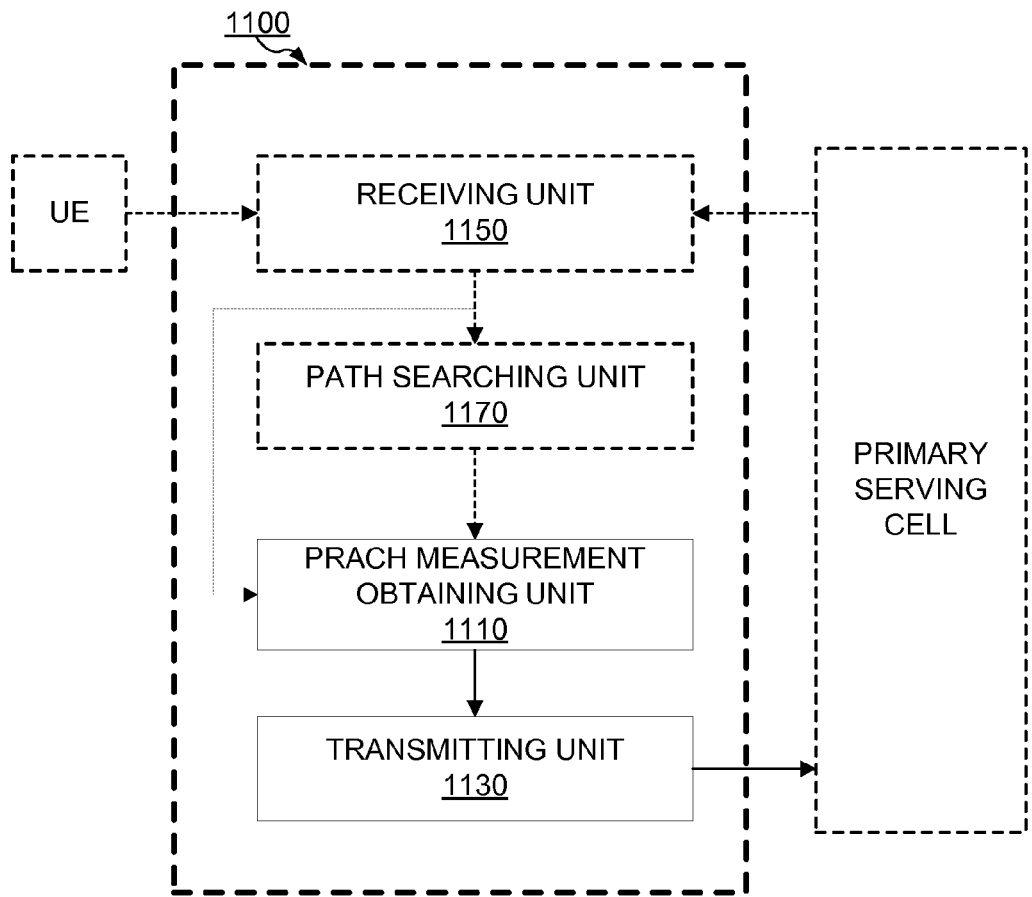
FIG. 11 is a block diagram illustrating an apparatus for use in a cell selection according to a fifth embodiment of the present invention.

FIG. 11 is a block diagram illustrating an apparatus 1100 for use in a cell selection for a UE at a primary serving cell of the UE in a CoMP cluster according to a fifth embodiment of the present application. The CoMP cluster includes the primary serving cell and one or more candidate cells. The apparatus 1100 serves one of the candidate cells. An example of the apparatus may be a base station.

As shown in FIG. 11, the apparatus 1100 may include a PRACH measurement obtaining unit 1110 and a transmitting unit 1130.

The PRACH measurement obtaining unit 1110 may be configured to obtain a PRACH measurement for the UE, and the transmitting unit 1130 may be configured to transmit the PRACH measurement to the primary serving cell for use in the cell selection.

By way of a non-limiting example, the PRACH measurement obtaining unit may be configured to obtain the PRACH measurement based on all PRACH preambles belonging to all cells in the CoMP cluster.

By way of a non-limiting example, the apparatus 1100 may further include a receiving unit 1150 (optional and denoted in dotted lines as shown in FIG. 11), which is configured to receive PRACH information of the UE from the primary serving cell. For example, the PRACH information may include at least one of the UE's scrambling code, PRACH preamble sequence, PRACH timing, and direction of angle (DoA), or any combinations thereof.

As an example, the receiving unit 1150 may further configured to receive a PRACH preamble signal from the UE. The PRACH measurement obtaining unit 1110 may be further configured to obtain the PRACH measurement based on the PRACH information and the PRACH preamble signal, which are received by the receiving unit 1150.

As another example, the receiving unit 1150 may be further configured to receive an instruction from the primary serving cell instructing the candidate cells to perform path searching based on the PRACH information. The apparatus 1110 may further include a path searching unit 1170 (optional and denoted in dotted lines as shown in FIG. 11), which is configured to perform, in response to the instruction received by the receiving unit 1150, path searching on an antenna of the one of the candidate cells, which is served by the apparatus 1100, based on the PRACH information to obtain a path strength as the PRACH measurement.

By way of a non-limiting example, the apparatus 1100 may be a base station or any other appropriate communication device serving one of the candidate cells in the CoMP cluster.

It should be noted that two or more different units in this disclosure may be logically or physically combined. For example, the apparatus 1000 and the apparatus 1100 may be combined as one single unit, and the transmitting unit 1130 and the receiving unit 1150 may be also combined into one single unit.

According to foregoing embodiments of the present application, the present application may achieve the following advantages:

Quickly determining the secondary serving cells;

Low complexity in determining the secondary serving cells;

Achieving CoMP gain with the following cell selections for:

Users at Cell_FACH

The signaling during radio link establishment

Short data transmission.

Other arrangements of the present disclosure include software programs performing the steps and operations of the method embodiments, which are firstly generally described and then explained in detail. More specifically, a computer program product is such an embodiment, which includes a computer-readable medium with a computer program logic encoded thereon. The computer program logic provides corresponding operations to provide the above described cell selection scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g., CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g., a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

AICH Acquisition Indicator Channel
CoMP Coordinated Multi-Point
CPICH Common Pilot Channel
DCH Dedicated Channel
DoA Direction of Arrival
DPCCH Dedicated Physical Control Channel
EUL Enhanced UpLink
FACH Forward Access Channel
G-Rake Generalized-Rake
HSPA High Speed Packet Access
ML Maximum Likelihood
MMSE Minimum-Mean-Squared-Error
MU Main Unit
MUD Multi-User Detection
PRACH Physical Random Access Channel
RRU Remote Radio Unit
RRC Radio Resource Control
SIC Successive Interference Cancellation
WCDMA Wideband Code Division Multiple Access
UE User Equipment

What is claimed is:

1. A method for performing a cell selection for a user equipment (UE), the method comprising:
   detecting, by a primary serving cell of the UE in a Coordinated Multi-Point (CoMP) cluster including the primary serving cell and one or more candidate cells, a Physical Random Access Channel (PRACH) preamble signal of the UE to obtain PRACH information of the UE;
   transmitting, by the primary serving cell, the PRACH information to the candidate cells for obtaining PRACH measurements;

receiving, by the primary serving cell, the PRACH measurements for the UE from the candidate cells, wherein the PRACH measurements are obtained by the candidate cells based on the PRACH information; and selecting, by the primary serving cell, from the candidate cells one or more cells for the UE as the UE's secondary serving cells based on the received PRACH measurements.

2. The method according to claim 1, wherein the PRACH measurements are strengths of a PRACH preamble signal from the UE, the strengths being obtained by the candidate cells.

3. The method according to claim 1, wherein the PRACH measurements are based on all PRACH preambles belonging to all cells in the CoMP cluster.

4. The method according to claim 1, wherein the PRACH information comprises at least one of the UE's scrambling code, PRACH preamble sequence, PRACH timing, and direction of angle (DoA).

5. The method according to claim 1, wherein each of the PRACH measurements is based on the PRACH information and a PRACH preamble signal, which is previously received by a corresponding candidate cell from the UE.

6. The method according to claim 1, further comprising:
instructing each of the candidate cells to perform path searching for the UE based on the PRACH information.

7. The method according to claim 6, wherein the path searching is performed on antennas at each of the candidate cells to obtain path strengths as the PRACH measurements.

8. The method according to claim 1, wherein the candidate cells are neighbor cells to the primary serving cell within the CoMP cluster.

9. The method according to claim 1, wherein the candidate cells are all cells in the CoMP cluster other than the primary serving cell.

10. The method according to claim 1, further comprising:
after receiving the PRACH measurements for the UE from the candidate cells, terminating the cell selection when all of the received PRACH measurements are lower than a first threshold.

11. The method according to claim 1, further comprising:
before receiving the PRACH measurements for the UE from the candidate cells, obtaining the primary serving cell's PRACH measurement for the UE and comparing the obtained PRACH measurement with a second threshold.

12. The method according to claim 11, further comprising:
terminating the cell selection when the primary serving cell's PRACH measurement for the UE is higher than the second threshold.

13. A non-transitory computer-readable storage medium having computer-readable instructions to facilitate cell selection for a user equipment (UE), the instructions being executable by a computing device, the instructions comprising:
detecting, by the computing device serving as a primary serving cell of the UE in a Coordinated Multi-Point (CoMP) cluster including the primary serving cell and one or more candidate cells, a Physical Random Access Channel (PRACH) preamble signal of the UE to obtain PRACH information of the UE;
transmitting, by the computing device, the PRACH information to the candidate cells for obtaining PRACH measurements;
receiving, by the computing device, the PRACH measurements for the UE from the candidate cells, wherein the PRACH measurements are obtained by the candidate cells based on the PRACH information; and
selecting, by the computing device, from the candidate cells one or more cells for the UE as the UE's secondary serving cells based on the received PRACH measurements.

14. An apparatus for performing a cell selection for a user equipment (UE), the apparatus comprising:
a processor and computer-readable storage medium coupled to the processor, the computer-readable storage medium including:
a detecting unit configured to detect a Physical Random Access Channel (PRACH) preamble signal of the UE in a Coordinated Multi-Point (CoMP) cluster including the apparatus serving as a primary serving cell and on or more candidate cells to obtain PRACH information of the UE;
a transmitting unit configured to transmit the PRACH information to the candidate cells for obtaining the PRACH measurements;
a receiving unit configured to receive PRACH measurements for the UE from the candidate cells, wherein the PRACH measurements are to be obtained by the candidate cells based on the PRACH information; and
a selecting unit configured to select from the candidate cells one or more cells for the UE as its secondary serving cells based on the received PRACH measurements.

15. The apparatus according to claim 14, wherein the PRACH measurements are strengths of a PRACH preamble signal from the UE, the strengths being obtained by the candidate cells.

16. The apparatus according to claim 14, wherein the PRACH measurements are based on all PRACH preambles belonging to all cells in the CoMP cluster.

17. The apparatus according to claim 14, wherein the PRACH information comprises at least one of the UE's scrambling code, PRACH preamble sequence, PRACH timing, and direction of angle (DoA).

18. The apparatus according to claim 14, wherein each of the PRACH measurements is based on the PRACH information and a PRACH preamble signal, which is previously received by a corresponding candidate cell from the UE.

19. The apparatus according to claim 14, further comprising:
an instructing unit configured to instruct each of the candidate cells to perform path searching for the UE based on the PRACH information.

20. The apparatus according to claim 19, wherein the path searching is to be performed on antennas at each of the candidate cells to obtain path strengths as the PRACH measurements.

21. An apparatus for use in a cell selection for a user equipment (UE), the apparatus comprising:
a processor and computer-readable storage medium coupled to the processor, the computer-readable storage medium including:
a receiving unit configured to receive a PRACH preamble signal from the UE and to receive PRACH information of the UE from a primary serving cell of the UE in a Coordinated Multi-Point (CoMP) cluster including the primary serving cell and one or more candidate cells, wherein the apparatus serves as one included candidate cell;

a Physical Random Access Channel (PRACH) measurement obtaining unit configured to obtain a PRACH measurement for the UE based on the PRACH information; and a transmitting unit configured to transmit the PRACH measurement to the primary serving cell for use in the cell selection.

22. The apparatus according to claim 21, wherein the PRACH measurement obtaining unit is configured to obtain the PRACH measurement based on all PRACH preambles belonging to all cells in the CoMP cluster.

23. The apparatus according to claim 21, wherein the PRACH information comprises at least one of the UE's scrambling code, PRACH preamble sequence, PRACH timing, and direction of angle (DoA).

24. The apparatus according to claim 21, wherein the PRACH measurement obtaining unit is configured to obtain the PRACH measurement based on the PRACH information and the PRACH preamble signal.

25. The apparatus according to claim 21, further comprising:

a path searching unit configured to perform path searching on an antenna the one of the candidate cells, which is served by the apparatus, based on the PRACH information to obtain a path strength as the PRACH measurement.

* * * * *